Oct. 24, 1944.  T. ROBINSON  2,360,893
METHOD AND APPARATUS FOR EFFECTING SONIC PULVERIZATION
AND DISPERSION OF MATERIALS
Filed July 13, 1943  2 Sheets-Sheet 1

INVENTOR.
THOMAS ROBINSON
BY
Louis Prevosh Whitaker
ATTORNEY.

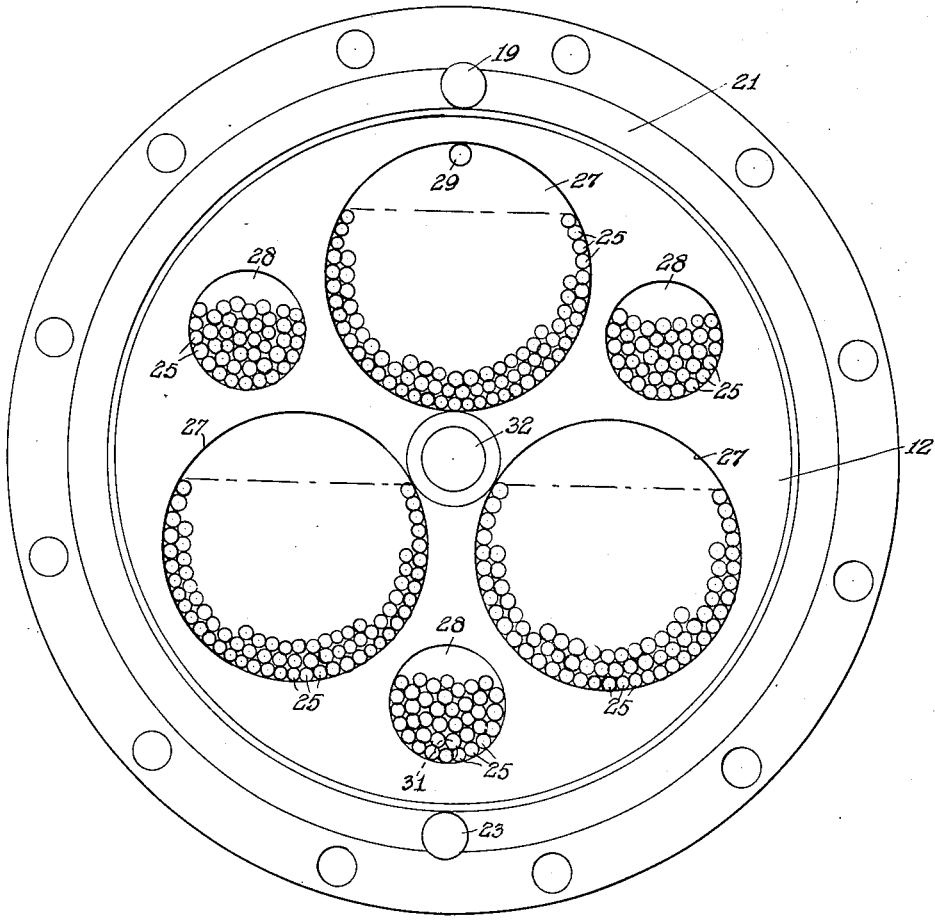

Patented Oct. 24, 1944

2,360,893

UNITED STATES PATENT OFFICE 2,360,893

METHOD AND APPARATUS FOR EFFECTING SONIC PULVERIZATION AND DISPERSION OF MATERIALS

Thomas Robinson, New York, N. Y.

Application July 13, 1943, Serial No. 494,453

20 Claims. (Cl. 259—1)

The present invention relates to a method of preparing dispersions of two or more substances and to apparatus for carrying out my new method. Such dispersions may, for example, be an emulsion of one liquid in another or a suspension of a solid in a liquid, it being understood that any desired number of liquids or solids may be used to produce more complex dispersions.

There has been heretofore proposed a method of preparing dispersions of two or more substances by subjecting the substances to a concentration of high frequency vibrations within the audio range. In accordance with the known method, the substances to be treated are placed in or passed through a chamber in intimate contact with a vibrating surface which imparts to the substances vibrational energy of such frequency and magnitude as to cause cavitation of the substance. Such cavitation is produced when the local velocity gradient resulting from the vibration is sufficient to reduce the internal hydrodynamic pressure to a point below the critical point of vaporization of at least one of the substances, whereupon voids or cavities are formed. Release of the sonic tension allows the collapse of such cavities with the force of a partially uncushioned water hammer. The vibration and resulting cavitation have been found to produce an emulsification or dispersal of one substance in another. However, in the use of vibrational energy alone, it has been found necessary to use high frequency and high energy values in order to obtain effective results. Moreover, in some instances a non-uniformity of the emulsion or dispersion has been observed and the rate of treatment is limited.

It is an object of the present invention to provide a novel method of preparing dispersions of two or more substances whereby greater uniformity and greater stability of the dispersal is obtained. A further object of my invention is to prepare such dispersions economically and at a high rate of production suitable for commercial as distinguished from experimental utilization of the method. A further object of my invention is to provide for effective and efficient apparatus for preparing such dispersions wherein the effectiveness of high frequency, high intensity vibration can be obtained while employing a source of vibrational energy of lower frequency.

In accordance with my invention the substances to be treated are subjected to vibration and are simultaneously subjected to mechanical impact between opposed surfaces whereby any globules or particles in the material are further broken up and thoroughly dispersed in the other constituents of the material. The nature of the impact or contact is preferably such as to result in attrition or tearing apart of the particles or globules, as for example where there is a sliding contact subjecting the globules or particles to shear as well as to crushing. A further feature of my invention is that the effectiveness of high intensity high frequency vibration is obtained without however requiring a correspondingly high frequency source of vibrational energy. This effect is obtained by providing in addition to the element to which the vibrational energy is initially imparted a plurality of freely movable elements adapted to be engaged by and impact on the first mentioned element the natural frequency of vibration of the latter elements being such that they are vibrated at a substantially higher frequency than that of the source. There is also provided in accordance with my invention a more thorough intermixing of the substances while they are being treated by vibration and impact so that a more uniform and more stable product is obtained.

Other objects and advantages of my invention will appear from the following description and claims in conjunction with the accompanying drawings in which there is shown by way of example apparatus embodying the invention.

In the drawings,

Fig. 2 is a transverse vertical sectional view taken approximately on the line 2—2 of Fig. 1.

Figure 1:
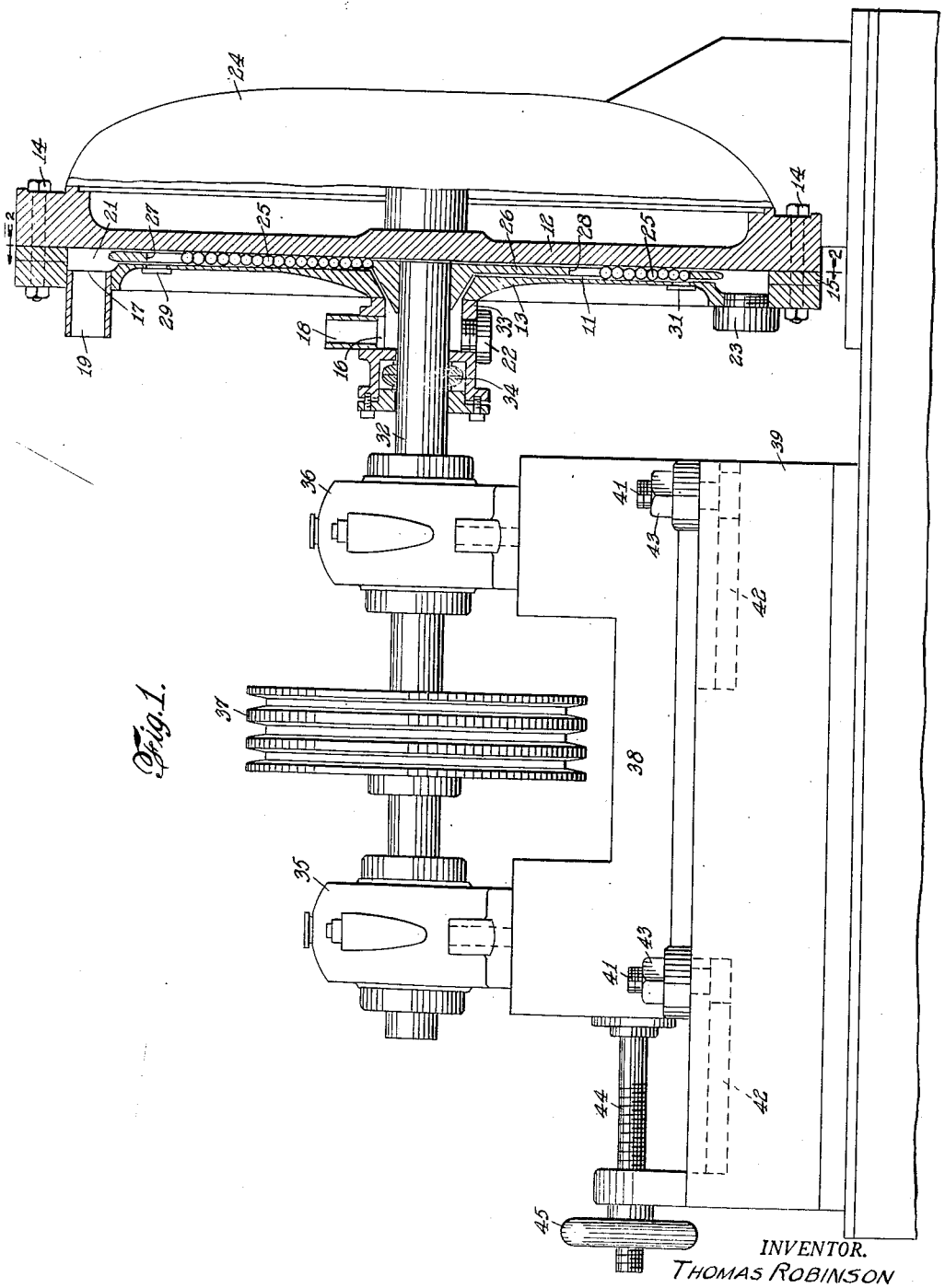
Fig. 1 is a side elevation of apparatus in accordance with my invention, certain portions of the apparatus being shown in section.

In the drawings there is shown a simple form of apparatus in accordance with my invention. The apparatus comprises an inclosure or chamber in which the substances to be treated are placed or through which they are passed for treatment. The treating chamber designated in general by the reference numeral 11 has opposed wall surfaces between which the material to be treated is passed, means being provided for vibrating at least a portion of said surface to transmit vibrational energy to the material in the chamber. In the form shown in the drawings the chamber is formed by a diaphragm 12 and a cover 13 which are connected with one another at their peripheries and have central portions that are spaced apart to provide a space for receiving the materials to be treated. For example, the periphery of the cover plate may be removably connected to the periphery of the diaphragm by means of a plurality of bolts 14, an annular gasket 15 being interposed between the diaphragm and cover to provide a fluid tight seal. Ingress to and egress from the treating chamber is provided by a plurality of openings 16 and 17 with which conduits 18 and 19 respectively are connected. The opening 16 communicates with the central portion of the treating chamber 11 while the opening 17 communicates with an annular space or passageway 21 which extends around the periphery of the treating chamber and communicates therewith either at spaced points or continuously as shown. The material, which should have a fluid phase so that it will flow through the conduit and the chamber, is fed into one of the openings and discharged from the other and it will be understood that the direction of flow through the chamber will hence be in an approximately radial direction. In the embodiment shown in the drawings, the conduit 18 is assumed to be the feed conduit and the conduit 19 the discharge, although the direction of flow can be reversed if desired. Removable plugs 22 and 23 are provided for draining the apparatus, as for example when it is desired to clean or disassemble it. The diaphragm 12 is designed to vibrate to impart vibrational energy to the material in the treating chamber 11, suitable means being provided for vibrating the diaphragm. In the drawings a source of vibrational energy is indicated by the reference numeral 24, no details of the vibrator being shown as it may be of conventional design. Such vibrating units are for example manufactured by the Submarine Signal Company of Boston, Massachusetts. The frequency of vibration of the diaphragm is determined by the nature of the material being treated and the result desired, higher frequency being employed when a more stable dispersion is desired or when the difficulty of obtaining a dispersion is greater, for example, by reason of the incompatibility of the constituent substances. However, it has been found that a frequency of 360 cycles per second may generally be employed. To keep energy consumption at a minimum, the diaphragm 12 and the vibrating unit 24 are preferably tuned to one another so that the diaphragm will be vibrated at its natural frequency or a harmonic thereof.

With the apparatus so far described it is possible to transmit vibrational energy to the material being treated and thereby produce cavitation in the material. In accordance with my invention the effectiveness of the treatment is greatly increased by providing in the treating chamber additional elements for simultaneously subjecting the material to impact and attrition and also to a thorough mixing action assuring uniformity of all portions of the material treated. In the drawings these additional elements are shown in the form of a plurality of balls or pellets 25 and a rotating element 26. The rotor 26 forms a cage for the balls 25 and is shown in the form of a perforate disc having a plurality of recesses or openings 27, 28 in which the balls 25 are disposed. To provide better distribution of the openings and balls certain of the openings 27 may be larger than others 28. The balls 25 are thus confined in the openings 27 and 28 and between a diaphragm 12 and cover 13, but are free to rotate and to move about within these limits. The openings 27, 28 in the disc may be completely filled with balls, but it is preferred to use a smaller number so that the balls only partially fill the openings, occupying for example about three-quarters of the area of each opening. With this arrangement the balls upon being carried around by rotation of the rotor or disc 26 will tumble about in the opening, thereby resulting in falling impacts in addition to the other effects herein explained. A removable plug 29 is provided in the cover 13 for inserting the balls into the recesses 27, 28, the disc 26 being turned to present the recesses in succession to the opening provided by the removal of plug 29 and the desired number of balls being fed into each recess. A similar removable plug 31 is provided for removing the balls. It will be understood that the balls or pellets 25 although shown in spherical form may be of other regular or irregular shape, or may be in the form of rollers. For convenience in assembling, the rotor or cage 26 may be constructed in such manner as to retain the rotating elements 25 independently of the diaphragm 12 and the cover plate 13. It will be noted that the thickness of the disc 26 and the diameter of the balls 25 are both less than the distance between the diaphragm 12 and cover 13 so that the elements 25 and 26 are free to move in the space between the diaphragm and cover.

Provision is made for rotating the rotor 26 by mounting it on the inner end of a shaft 32 which extends out through a central boss or hub 33 with which the cover 13 is provided. A packing gland 34 provides a fluid tight seal between the cover plate and shaft. The shaft 32 is supported by bearings 35, 36 and a pulley or other driving element 37 is provided for rotating the shaft and disc. The bearings 35, 36 are mounted on a carriage 38 which is slidably supported on a base 39 for movement in a direction parallel to the axis of the shaft. The carriage is guided in its movement by bolts 41 sliding in undercut grooves 42 in the base 39. It will be understood that by tightening nuts 43 on bolts 41 the carriage can be locked in position. Suitable means, for example, a threaded shaft 44 and hand wheel 45 is provided for moving the carriage 38 back and forth. This arrangement makes it possible to move the disc 26, cover 13, shaft 32 and associated parts away from the diaphragm 12 as a unit when the connecting bolts 14 have been removed so that the interior of the apparatus can be easily and thoroughly cleaned.

In carrying out my novel method with the apparatus shown, the material to be treated is fed into the treating chamber through the inlet 18 and discharged from the outlet 19. Unless the material includes a liquid phase, a suitable fluid may be added so that the material will flow through the treating chamber. For example, if it is desired to treat powdered solid material, the material may be mixed with a liquid, e. g. water, or a gaseous medium, for example, a vapor or an inert gas such as carbon dioxide. Treatment of the material passing through the treating chamber is effected by vibrating the diaphragm 12 and simultaneously rotating the rotor 26. The speed of rotation of the rotor 26 may be varied as desired, but is preferably sufficiently low that the balls 25 will tumble about in the apertures 27 and 28 in the disc rather than being held to the outside of the apertures by centrifugal force. A speed-up of 100 R. P. M. has been found to be satisfactory. The action of the disc 26 and the balls 25 in greatly increasing the effectiveness of the treatment is rather complex. It appears that the effect of cavitation explained above is greater at an interface between a liquid and a solid than it is in the liquid itself. By reason of the large surface area provided by the disc 26 and particularly by the balls 25, cavitation is greatly increased. Moreover, the vibrational energy of the diaphragm 12 is transmitted to the balls 25, causing the latter to bounce rapidly back and forth between the diaphragm and the cover. As the natural frequency of the balls is different from and ordinarily much higher than the frequency at which the diaphragm 12 is vibrated, the balls are subjected to vibration of a much higher frequency than the source of vibrational energy. Hence, although the diaphram may be vibrated at a relatively low frequency, for example, 360 cycles per second, the greater effectiveness of higher frequency of vibration is obtained by reason of the high frequency of the induced vibration of the balls.

The disc 26 is also free to move in an axial direction to that vibratory motion can be imparted to it through the material in the treating chamber. Any axial movement of the disc is damped by the effect of the packing gland 34 and the bearings 35, 36 so that the disc will tend to stay in approximately the center of the space between the diaphragm 12 and the cover 13. As the disc 26 is cushioned on both sides by the material being treated, no injuries to the disc result from the high intensity vibration of the diaphragm 12 and the balls 25.

In addition to the effect produced by the vibration of the element contacting the material in the treating chamber, further reduction of the size of any particles or globules in the material is obtained and a more thorough and stable dispersion produced by the impact of the balls 25 with one another and with the confining surfaces, i. e., the diaphragm 12, cover 13 and the disc 26. As the balls vibrate rapidly between the diaphragm and cover, impacts occur between the balls and these surfaces and between adjacent balls. By reason of the rotation of the balls imparted, for example, by rotation of the disc 26, these impacts are in many instances of a sliding or glancing nature so that any particles or globules between the surfaces are subjected to a shearing or tearing action as well as to crushing. It is this tearing apart of the globules or particles that is herein referred to as "attrition." Still further impacts of the balls are produced by the tumbling action of the balls as the disc 26 is rotated on its axis. Moreover, it will be understood that by reason of the movement of the balls and the rotation of the rotor 26, the material being treated is subjected to a thorough mixing action simultaneously with the action by cavitation, impact and attrition heretofore described. Hence, not only are the particles or globules in the material reduced to an exceedingly small size, but they are interspersed with one another and with other phases of the material in such a thorough manner as to produce an exceptionally stable dispersion. The revolving rotor 26 also acts as the impeller of a pump facilitating the flow of material from the central inlet to a peripheral outlet. This additional feature may be of particular importance in handling materials that do not flow readily.

As the temperature and pressure of the material being treated affects the formation or stabilization of a dispersion, for example, by affecting cavitation, it is preferable to provide means for controlling both temperature and pressure. This can be done, for example by controlling the rates of feed and discharge of the material and by providing suitable temperature controlling facilities. For example, if it is desired to treat materials that are solid at ordinary temperatures, the temperature of the material may be raised to a point where it is sufficiently fluid to be passed through the treating chamber and subjected to treatment.

While best results are obtained by using both the freely movable balls or pellets 25 and the rotor 26, it will be understood that beneficial effects are obtained from each of these instrumentalities and it would hence be possible to use one without the other. Moreover, it will be understood that the treating chamber, the rotor and the impact members 25 may be of different shape than that shown in the drawings. For example, instead of there being a well defined treating chamber, the treatment may be carried out in a portion of a continuous conduit or passageway.

The novel method and apparatus in accordance with the invention is applicable to a wide variety of problems and uses. As an indication of the materials that can be handled but without in any way limiting the invention to such materials, the following may be mentioned.

1. Suspensions of insoluble drugs in aqueous media, for example the sulfonamides in neutral salt solutions or water, or desoxycorticosterone in neutral salt solutions.

2. Suspensions or emulsions of water soluble drugs in oils to decrease the rate of absorption and utilization, for example, benzedrine in peanut oil or pituitrin in peanut oil.

3. Suspensions of finely dispersed metals and metallic oxides in aqueous or oleagenous bases, for example, colloidal silver oxide in mineral oil.

4. The production of disintegration products of bacterial and tissue cells for use as vaccines or to facilitate the extraction of various enzymes and hormones.

5. The preparation of homogenized products, for example, the homogenization of milk, ice cream mixes, cosmetics, pharmaceutical creams and ointments, printing inks, resin varnishes, etc.

6. The production of depolymerization products such as the depolymerization of synthetic resins and arsenobenzol derivatives.

7. The production of pulverized products where a high degree of pulverization is desired.

It will thus be seen from the examples mentioned above that my method and apparatus have a wide field of utilization. In speaking of preparing a dispersion or other material, in the specification or claims, it is understood to mean either the initial production of the composition or a subsequent treatment thereof. For example, the method and apparatus can be used either in initially preparing a dispersion of two or more substances or in subsequently treating a dispersion already prepared in order to improve its properties, for example, by increasing its stability. The term "dispersion" is used in its widest sense to include suspensions and emulsions and all of the materials mentioned by way of example above as well as other materials or substances to which the term is applicable.

What I claim and desire to secure by Letters Patent is:

1. Apparatus for preparing dispersions of two or more substances, which comprises an enclosure for said substances, said enclosure having spaced wall surfaces, a plurality of pellets disposed between said surfaces, and means for vibrating at least one of said walls at a frequency different from the natural frequency of vibration of said pellets, to cause said pellets to vibrate at a frequency higher than the frequency of vibration of said wall.

2. Apparatus for preparing dispersions of two or more substances, which comprises an enclosure for said substances, said enclosure having spaced wall surfaces, a relatively rotatable disc disposed between said surfaces, means for producing relative rotation between said enclosure and said element, and means for applying vibrations to one only of said wall surfaces.

3. Apparatus for preparing dispersions of two or more substances, which comprises a chamber adapted to receive said substances and having spaced wall surfaces, a rotatable element disposed between said surfaces, said element being rotatable about its axis and movable in a direction longitudinal of its axis, means for rotating said element, and means for vibrating at least one of said wall surfaces.

4. Apparatus for preparing dispersions of two or more substances, which comprises a diaphragm, means for vibrating said diaphragm, a cover plate sealed to said diaphragm at its periphery and having a central portion spaced from said diaphragm, means for feeding the material to be treated into the space between the diaphragm and the cover plate, a rotatable perforate disc disposed between said diaphragm and cover plate, and means for rotating said disc.

5. Apparatus for preparing dispersions of two or more substances, which comprises a chamber having spaced opposed wall surfaces, means for vibrating at least one of said wall surfaces, means for feeding the substances to be treated into said chamber, a rotatable element disposed between said wall surfaces, said element being rotatable about its axis and being reciprocable in an axial direction, and means for damping axial movement of said element.

6. Apparatus for preparing dispersions of two or more substances, which comprises a diaphragm, means for vibrating said diaphragm, a cover removably connected with said diaphragm at its periphery, a rotatable shaft extending through said cover, a rotor mounted on said shaft and disposed between said diaphragm and cover, said rotor, shaft and cover being movable away from said diaphragm to afford access to said rotor, diaphragm and cover.

7. Apparatus for preparing dispersions of two or more substances, which comprises a chamber having spaced wall surfaces, means for feeding the substances to be treated into said chamber, a plurality of balls disposed between said surfaces, a rotor engaging said balls, means for rotating said rotor, and means for vibrating at least one of said wall surfaces.

8. Apparatus for preparing dispersions of two or more substances, which comprises a chamber having spaced wall surfaces and an inlet for feeding the substances to be treated into said chamber, means for vibrating at least a portion of said wall surfaces, a rotatable cage disposed in said chamber, means for rotating said cage, and a plurality of rotatable elements carried by said cage.

9. Apparatus for preparing dispersions of two or more substances, which comprises a diaphragm and a cover plate connected at their peripheries and forming a chamber between them, said chamber having an inlet to admit the substances to be treated, means for vibrating said diaphragm, a rotatable disc disposed between said wall surfaces and having a plurality of recesses, means for rotating said disc, and a plurality of balls disposed in said recesses.

10. Apparatus for preparing a dispersion of two or more substances of which at least one is in liquid form, which comprises a circular chamber, means for vibrating a wall of said chamber, an annular passageway extending around said chamber and communicating therewith, conduits communicating respectively with the center of said chamber and with said annular passageway, one of said conduits providing an inlet to said chamber and another an outlet from said chamber, thereby providing for flow of fluid through said chamber in an approximately radial direction, and a rotating element for imparting turbulence and an increment of rotary movement to said fluid in its travel from the inlet to the outlet of said chamber.

11. Apparatus for preparing dispersions of two or more substances, which comprises a chamber to contain the substances to be treated and having opposed wall surfaces, a plurality of impact elements disposed between said surfaces and movable relative thereto, and means for vibrating one of said walls in a direction transverse to its inner surface to impart vibration to said substances and said impact elements, and simultaneously to subject said substances to impact between said elements and surfaces.

12. Apparatus for preparing dispersions of two or more substances, which comprises a chamber to contain said substances and having opposed wall surfaces, a plurality of impact elements disposed between said surfaces and freely movable therebetween, and means for vibrating one of said walls in a direction transverse to its inner surface to impart vibrational energy to said substances and said elements, and to produce impact of said elements alternately with said opposed wall surfaces.

13. Apparatus for subjecting fluent material to treatment by high frequency compressional waves and impact, which comprises a diaphragm, a housing sealed to said diaphragm at its periphery and having a central portion spaced from said diaphragm, a plurality of balls loosely confined in the space between said housing and diaphragm, means for feeding the material to be treated through said space, and means for vibrating said diaphragm to subject said material to high frequency compressional waves and to induce reciprocation of said balls and impact of said balls with said diaphragm.

14. Apparatus for subjecting fluent material to treatment by high frequency compressional waves and impact, which comprises a diaphragm, a cover plate spaced from said diaphragm and having its periphery sealed thereto to form a treating chamber, a layer of balls loosely confined in the space between said diaphragm and cover plate, means for passing the material to be treated through said space in a direction generally parallel to the inner surface of said diaphragm, and means for vibrating said diaphragm and thereby inducing reciprocation of said balls back and forth between said diaphragm and cover plate to subject said material to vibration and to the impact of said balls with said diaphragm and cover plate.

15. Apparatus for preparing dispersions of two or more substances which comprises a diaphragm, a cover plate sealed to said diaphragm at its periphery and having a central portion spaced from said diaphragm, means for feeding material to be treated through the space between the diaphragm and the cover plate, a perforate disc disposed between said diaphragm and cover plate, said diaphragm and disc being movable relative to one another, and means for vibrating said diaphragm in a direction transverse to said disc.

16. The method of subjecting fluent material to treatment by high frequency compressional waves and impact, which comprises passing said material under controlled pressure, temperature and rate of flow between a plurality of impact elements loosely confined between closely spaced walls, and vibrating one of said walls during flow of said material therebetween to subject said material to high frequency compressional waves in a direction transverse to the direction of flow and simultaneously subjecting said material to repeated impact between said walls and said impact elements induced by said vibration.

17. The method of subjecting fluent material to treatment by high frequency compressional waves and impact, which comprises forcing said fluent material through tortuous paths between a plurality of impact elements loosely confined between closely spaced opposed walls, controlling the rate of flow of said material and vibrating one of said walls in a direction transverse to the general direction of flow of said material to subject said material to high frequency compressional waves of sufficient intensity to produce cavitation in said material and simultaneously inducing reciprocation of said impact elements back and forth between said opposed walls to present rapidly changing paths of flow to said material and subjecting said material to repeated impact between said walls and said reciprocating impact elements.

18. The method of subjecting fluent material to treatment by high frequency compressional waves and impact, which comprises passing said fluent material between a plurality of impact elements loosely confined between closely spaced walls and vibrating one of said walls during flow of said material therebetween, to subject said material to high frequency compressional waves in a direction transverse to the direction of flow, the spacing of said walls and amplitude and frequency of said vibrations being such as to cause reciprocation of said impact elements back and forth between said walls, whereby said material is subjected to impact between said walls and said impact elements.

19. The method of preparing a dispersion of two or more materials, which comprises passing said materials under controlled temperature, pressure and rate of flow through a treating chamber, containing a plurality of impact elements loosely confined between opposed walls of said chamber, vibrating one of said walls in a direction transverse to the direction of flow to apply vibrational energy to said materials and to produce reciprocation of said elements and thereby subject said materials to impact of said elements with one another and with said walls, and producing relative movement between said elements and walls other than said reciprocation to change continually the points of said impact.

20. The method of treating comminuted solid material, which comprises suspending said material in a gaseous medium, passing said suspended material between a plurality of impact elements loosely confined between opposed walls and applying vibrational energy to one of said walls during flow of material therebetween to subject said material to high frequency compressional waves in a direction transverse to the direction of flow and simultaneously subjecting said material to repeated impact between said walls and said impact elements induced by said vibration.

THOMAS ROBINSON.